(12) United States Patent
Barhorst et al.

(10) Patent No.: US 11,633,814 B2
(45) Date of Patent: *Apr. 25, 2023

(54) SYSTEMS AND METHODS FOR WELDING ELECTRODES

(71) Applicant: Hobart Brothers LLC, Troy, OH (US)

(72) Inventors: Steven Edward Barhorst, Sidney, OH (US); Mario Anthony Amata, Dublin, OH (US); Kevin Pagano, Algonquin, IL (US)

(73) Assignee: HOBART BROTHERS LLC, Troy, OH (US)

( * ) Notice: Subject to any disclaimer, the term of this patent is extended or adjusted under 35 U.S.C. 154(b) by 256 days.

This patent is subject to a terminal disclaimer.

(21) Appl. No.: 16/011,349

(22) Filed: Jun. 18, 2018

(65) Prior Publication Data

US 2018/0297151 A1 Oct. 18, 2018

Related U.S. Application Data

(60) Division of application No. 13/743,178, filed on Jan. 16, 2013, now Pat. No. 9,999,944, which is a
(Continued)

(51) Int. Cl.
*B23K 35/00* (2006.01)
*B23K 35/02* (2006.01)
(Continued)

(52) U.S. Cl.
CPC .......... *B23K 35/00* (2013.01); *B23K 35/0261* (2013.01); *B23K 35/368* (2013.01); *B23K 35/38* (2013.01)

(58) Field of Classification Search
None
See application file for complete search history.

(56) References Cited

U.S. PATENT DOCUMENTS

| 1,763,417 | A | * | 6/1930 | Clarke | ............... | B23K 35/3603 |
| | | | | | | 428/368 |
| 2,053,956 | A | | 9/1936 | Humberstone | | |

(Continued)

FOREIGN PATENT DOCUMENTS

| AU | 2009202190 | 1/2010 |
| CN | 1323673 | 11/2001 |

(Continued)

OTHER PUBLICATIONS

"Sodium Carboxymethyl Cellulose," FNP 13/2, 1984.
(Continued)

*Primary Examiner* — Justin C Dodson
(74) *Attorney, Agent, or Firm* — McAndrews Held & Malloy, Ltd.

(57) ABSTRACT

The invention relates generally to welding and, more specifically, to welding wires for arc welding, such as Gas Metal Arc Welding (GMAW) or Flux Core Arc Welding (FACW). In one embodiment, a tubular welding wire includes a sheath and a core, and the core comprises a rare earth silicide component (cerium, lanthanum, or a combination thereof). The core may also comprise an organic stabilizer component, a carbon component, and an agglomerate. The organic stabilizer component may comprise an organic molecule or organic polymer bound to one or more Group I or Group II metals. The carbon component may comprise graphite, graphene, carbon black, lamp black, carbon nanotubes, diamond, or a combination thereof. The agglomerate may comprise oxides of one or more Group I or Group II metals, titanium, and manganese.

10 Claims, 2 Drawing Sheets

Related U.S. Application Data continuation-in-part of application No. 13/596,713, filed on Aug. 28, 2012, now Pat. No. 9,199,341.

(51) Int. Cl.
  *B23K 35/38* (2006.01)
  *B23K 35/368* (2006.01)

(56) References Cited

U.S. PATENT DOCUMENTS

| | | | | |
|---|---|---|---|---|
| 2,613,304 | A | 10/1952 | Colinet | |
| 2,870,047 | A | 1/1959 | Kee | |
| 2,895,854 | A | 7/1959 | Rocque | |
| 2,900,490 | A | 8/1959 | Petryck | |
| 3,036,205 | A | 5/1962 | Masao | |
| 3,107,176 | A | 10/1963 | Witherell | |
| 3,124,479 | A | 3/1964 | Witherell | |
| 3,167,450 | A | 1/1965 | Masao | |
| 3,318,729 | A | 5/1967 | Siegle | |
| 3,342,972 | A | 9/1967 | Penberg | |
| 3,345,495 | A | 10/1967 | Quaas | |
| 3,452,419 | A | 7/1969 | Hillert | |
| 3,453,142 | A | 7/1969 | Dorschu | |
| 3,491,225 | A | 1/1970 | Oku | |
| 3,501,354 | A * | 3/1970 | Long | B23K 35/36 148/23 |
| 3,519,783 | A | 7/1970 | Forsberg | |
| 3,533,152 | A | 10/1970 | Gloor | |
| 3,542,998 | A | 11/1970 | Huff | |
| 3,554,792 | A | 1/1971 | Johnson | |
| 3,555,240 | A | 1/1971 | Gloor | |
| 3,558,851 | A | 1/1971 | Oku | |
| 3,559,864 | A | 2/1971 | Hillert | |
| 3,560,702 | A | 2/1971 | Arikawa | |
| 3,620,830 | A | 11/1971 | Kramer | |
| 3,625,757 | A | 12/1971 | Mott | |
| 3,627,574 | A * | 12/1971 | Delong | B23K 35/365 428/562 |
| 3,643,061 | A | 2/1972 | Duttera | |
| 3,768,996 | A | 10/1973 | Metz | |
| 3,769,099 | A | 10/1973 | DeLong | |
| 3,778,588 | A | 12/1973 | Bishel | |
| 3,783,234 | A | 1/1974 | Russell | |
| 3,805,016 | A | 4/1974 | Soejima | |
| 3,818,178 | A | 6/1974 | Nakabayashi | |
| 3,851,143 | A | 11/1974 | Bishel | |
| 3,909,253 | A | 9/1975 | Asnis | |
| 3,935,414 | A | 1/1976 | Ballass | |
| 3,947,655 | A | 3/1976 | Gonzalez | |
| 3,999,036 | A | 12/1976 | Muratov | |
| 4,122,238 | A | 10/1978 | FrantzerbSr | |
| 4,131,784 | A | 12/1978 | Kimura | |
| 4,189,539 | A | 2/1980 | Ward | |
| 4,245,145 | A | 1/1981 | Maniar | |
| 4,296,921 | A | 10/1981 | Hayashi | |
| 4,343,984 | A | 8/1982 | Smith | |
| 4,355,054 | A * | 10/1982 | Nagano | B23K 35/404 427/126.2 |
| 4,367,394 | A * | 1/1983 | Sakai | B23K 35/365 148/24 |
| 4,551,610 | A | 11/1985 | Amata | |
| 4,593,174 | A * | 6/1986 | Saito | B23K 35/3066 219/137 WM |
| 4,662,952 | A * | 5/1987 | Barringer | B23K 35/365 148/23 |
| 4,689,461 | A | 8/1987 | Gamberg | |
| 4,721,837 | A | 1/1988 | Gamberg | |
| 4,738,389 | A | 4/1988 | Moshier | |
| 4,790,887 | A * | 12/1988 | Niinivaara | B23K 9/0061 148/23 |
| 4,843,212 | A | 6/1989 | Shneerov | |
| 4,920,254 | A | 4/1990 | DeCamp | |
| 4,940,882 | A | 7/1990 | Bates | |
| 5,055,655 | A | 10/1991 | Chai | |
| 5,091,628 | A * | 2/1992 | Chai | B23K 35/3605 219/137 WM |
| 5,218,757 | A | 6/1993 | Kaneko | |
| 5,294,485 | A | 3/1994 | Takao | |
| 5,300,754 | A | 4/1994 | Gonzalez | |
| 5,330,850 | A | 7/1994 | Suzuki | |
| 5,369,244 | A | 11/1994 | Kulikowski | |
| 5,473,139 | A | 12/1995 | Matsui | |
| 5,580,475 | A | 12/1996 | Sakai | |
| 5,708,253 | A * | 1/1998 | Bloch | B23K 9/0953 219/130.01 |
| 5,744,782 | A | 4/1998 | Sampath | |
| 5,780,809 | A * | 7/1998 | Landrio | B23K 35/0261 219/145.23 |
| 5,857,141 | A | 1/1999 | Keegan | |
| 5,898,022 | A | 4/1999 | Maples | |
| 6,339,209 | B1 | 1/2002 | Kotecki | |
| 6,410,885 | B1 | 6/2002 | Correia | |
| 6,476,356 | B2 | 11/2002 | Kim | |
| 6,582,835 | B2 | 6/2003 | Antoni | |
| 6,608,284 | B1 | 8/2003 | Nikodym | |
| 6,723,954 | B2 | 4/2004 | Nikodym | |
| 6,940,042 | B2 | 9/2005 | Hara | |
| 7,087,859 | B2 | 8/2006 | Burt | |
| 7,087,860 | B2 | 8/2006 | Nikodym | |
| 7,241,970 | B2 | 7/2007 | Fortain | |
| 7,521,081 | B2 | 4/2009 | Butler | |
| 7,781,701 | B2 | 8/2010 | Burt | |
| 7,807,948 | B2 | 10/2010 | Katiyar | |
| 7,812,284 | B2 | 10/2010 | Narayanan | |
| 8,258,432 | B2 | 9/2012 | Narayanan | |
| 8,337,643 | B2 | 12/2012 | Sun | |
| 8,748,778 | B2 | 6/2014 | Kodama | |
| 8,758,901 | B2 | 6/2014 | Nakamura | |
| 8,907,248 | B2 | 12/2014 | Amata | |
| 9,199,341 | B2 | 12/2015 | Barhorst | |
| 9,950,394 | B2 | 4/2018 | Barhorst | |
| 2002/0008096 | A1 | 1/2002 | Kim | |
| 2002/0153364 | A1 | 10/2002 | North | |
| 2003/0019856 | A1 | 1/2003 | Correia | |
| 2003/0136765 | A1 | 7/2003 | Miklos | |
| 2003/0136774 | A1 | 7/2003 | Nikodym | |
| 2003/0178402 | A1 | 9/2003 | Nikodym | |
| 2003/0222059 | A1 | 12/2003 | De Kock | |
| 2004/0020912 | A1 | 2/2004 | Hara | |
| 2004/0084421 | A1 | 5/2004 | Bolton | |
| 2004/0187961 | A1 | 9/2004 | Crockett | |
| 2005/0040143 | A1 | 2/2005 | Neff | |
| 2005/0121110 | A1 | 6/2005 | Dallam | |
| 2005/0205525 | A1 | 9/2005 | Barhorst | |
| 2005/0224481 | A1 | 10/2005 | Nadzam | |
| 2006/0081579 | A1* | 4/2006 | Kotecki | B23K 35/3053 219/145.22 |
| 2006/0096966 | A1* | 5/2006 | Munz | B23K 35/36 219/145.22 |
| 2006/0128946 | A1 | 6/2006 | Weiner | |
| 2006/0186103 | A1 | 8/2006 | Rajan | |
| 2006/0196919 | A1 | 9/2006 | James | |
| 2006/0207984 | A1* | 9/2006 | Karogal | B23K 35/368 219/145.22 |
| 2006/0255027 | A1 | 11/2006 | Katiyar | |
| 2006/0261054 | A1 | 11/2006 | Katiyar | |
| 2006/0278627 | A1 | 12/2006 | Burt | |
| 2006/0283848 | A1 | 12/2006 | Karogal | |
| 2006/0289394 | A1 | 12/2006 | Revel | |
| 2007/0090168 | A1* | 4/2007 | Snow | B23K 9/28 228/101 |
| 2008/0000892 | A1 | 1/2008 | Hirano | |
| 2008/0014458 | A1 | 1/2008 | Posch | |
| 2008/0103228 | A1* | 5/2008 | Falcone | C08B 11/20 523/105 |
| 2008/0206594 | A1 | 8/2008 | Fukuda | |
| 2008/0272100 | A1 | 11/2008 | Amata | |
| 2009/0017328 | A1 | 1/2009 | Katoh | |
| 2009/0039065 | A1 | 2/2009 | Nakamura | |
| 2009/0095720 | A1 | 4/2009 | Kamei | |
| 2009/0158889 | A1 | 6/2009 | Kodama | |

(56) References Cited

U.S. PATENT DOCUMENTS

| | | | |
|---|---|---|---|
| 2009/0241336 A1* | 10/2009 | Karnes | B23K 35/406 29/245 |
| 2009/0242536 A1* | 10/2009 | Nagashima | B23K 35/0266 219/145.22 |
| 2009/0314759 A1 | 12/2009 | Schaeffer | |
| 2009/0314760 A1 | 12/2009 | Mizumoto | |
| 2009/0321404 A1* | 12/2009 | Keegan | B23K 35/0261 219/146.24 |
| 2010/0147818 A1 | 6/2010 | Fondriest | |
| 2011/0017712 A1 | 1/2011 | Wada | |
| 2011/0114606 A1 | 5/2011 | Suzuki | |
| 2011/0174784 A1 | 7/2011 | Kamei | |
| 2011/0297658 A1 | 8/2011 | Peters | |
| 2011/0240604 A1 | 10/2011 | Panday | |
| 2011/0253691 A1 | 10/2011 | Kodama | |
| 2012/0130065 A1* | 5/2012 | Labeau | C08B 37/0093 536/98 |
| 2012/0248069 A1* | 10/2012 | Fisher | B23K 9/1043 219/74 |
| 2013/0012696 A1 | 1/2013 | Adden | |
| 2013/0043219 A1 | 2/2013 | Peters | |
| 2013/0153557 A1 | 6/2013 | Pagano | |
| 2013/0193124 A1 | 8/2013 | Peters | |
| 2013/0233839 A1* | 9/2013 | Barhorst | B23K 35/38 219/137 WM |
| 2013/0270248 A1 | 10/2013 | Barhorst et al. | |
| 2013/0292362 A1 | 11/2013 | Fairchild | |
| 2013/0313240 A1 | 11/2013 | Amata | |
| 2014/0061166 A1 | 3/2014 | Barhorst | |
| 2014/0061175 A1 | 3/2014 | Barhorst | |
| 2014/0061179 A1 | 3/2014 | Barhorst | |
| 2015/0038584 A1 | 2/2015 | Fridman | |
| 2015/0096965 A1 | 4/2015 | Kawamoto | |
| 2015/0275341 A1 | 10/2015 | Cheney | |

FOREIGN PATENT DOCUMENTS

| | | | |
|---|---|---|---|
| CN | 1608792 A | 4/2005 | |
| CN | 17149840 | 1/2006 | |
| CN | 1974106 | 6/2007 | |
| CN | 101288918 | 10/2008 | |
| CN | 101323057 | 12/2008 | |
| CN | 101618486 | 1/2010 | |
| CN | 10265792 | 8/2010 | |
| CN | 102009286 | 4/2011 | |
| CN | 102059476 | 5/2011 | |
| CN | 102060296 A | 5/2011 | |
| CN | 102091881 | 6/2011 | |
| CN | 102371444 | 3/2012 | |
| CN | 102407413 A | 4/2012 | |
| CN | 102990244 | 3/2013 | |
| CN | 103381525 | 11/2013 | |
| CN | 103920965 | 7/2014 | |
| CN | 104093517 | 10/2014 | |
| DE | 274513 | 9/1969 | |
| EP | 0652071 | 5/1995 | |
| EP | 0688630 | 12/1995 | |
| EP | 1155769 | 11/2001 | |
| EP | 1537940 | 6/2005 | |
| EP | 1775060 | 4/2007 | |
| EP | 2110195 | 10/2009 | |
| EP | 2341159 | 7/2011 | |
| GB | 363815 | 12/1931 | |
| GB | 863072 | 3/1961 | |
| GB | 000922787 A * | 4/1963 | B23K 35/0261 |
| GB | 937063 | 9/1963 | |
| GB | 1007039 | 10/1965 | |
| GB | 1383304 | 2/1974 | |
| GB | 1497347 | 1/1978 | |
| JP | S54056045 | 5/1979 | |
| JP | S57159294 | 10/1982 | |
| JP | S60257992 | 12/1985 | |
| JP | S6281288 | 4/1987 | |
| JP | S62107897 | 5/1987 | |
| JP | S63212093 | 9/1988 | |
| JP | 02274395 A * | 11/1990 | B23K 35/368 |
| JP | 2010005674 | 1/2010 | |
| SU | 407695 | 12/1973 | |
| WO | 8907036 | 8/1982 | |
| WO | 2005115680 | 12/2005 | |
| WO | 2008004699 | 1/2008 | |
| WO | 2011120533 | 10/2011 | |
| WO | 2014036035 | 3/2014 | |
| WO | 2014113155 | 7/2014 | |

OTHER PUBLICATIONS

"Sodium Carboxymethylcellulose: Physical and Chemical Properties," Hercules Incorporated, Aquaion Division, 1999.

"Specification for Stainless Steel Flux Cored and Metal Cored Welding Electrodes and Rods," American Welding Society 4th Edition, AWS 5.22/A5.22M:2010, Aug. 27, 2009, ISBN 978-0-87171-764-1, pp. 3,18, 19, 28, and 29.

Anonymous; "Sodium Carbonate," Wikipedia, The Free Encyclodedia, http://en.wikipedia.org/wiki/Sodium_carbonate [retrieved on Aug. 5, 2015].

ARC Welding Automotive Components, Chrysler Group LLC Process Standard Category Code: D-1, Sep. 8, 2009, pp. 1-16.

Baker, Cathleen; "Methylcellulose & Sodium Carboxymethylcellulose: Uses in Paper Conservation," The American Institute for Conservation, Fall 1982.

International Search Report from PCT application No. PCT/US2013/056907, dated Dec. 13, 2013, 14 pgs.

International Search Report from PCT application No. PCT/US2013/074533, dated Sep. 30, 2014, 16 pgs.

International Search Report from PCT application No. PCT/US2013/074536, dated Sep. 29, 2014, 6 pgs.

International Search Report from PCT application No. PCT/US2014/059701, dated Jul. 10, 2015, 17 pgs.

International Search Report from PCT application No. PCT/US2015/055184, dated Jan. 27, 2016, 14 pgs.

Tae-Jin, Kim, et al.; "Characteristics of Pulse MIG Arc Welding with a Wire Melting Rate Change by Current Polarity Effect," Journal of Electrical Engineering & Technology, vol. 2, No. 3, Sep. 1, 2007, pp. 366-372.

Stainless Steel Overview (Stainless Plate Products) [retrieved on Sep. 26, 2017], Retrieved from: <URL:http://http://www.sppusa.com/stainlesssteel_overview.php> (Year 2017).

Du et al., "Welding of Dissimilar Metals", May 31, 1986, pp. 43-44.

Wu et al., "Guide for Selecting Welding Wire (Second Edition)", Jun. 30, 2011, p. 45.

Wu et al., "Welding Technology", Jul. 31, 2002, pp. 133-135.

Palmer et al., "Subsea Pipeline Engineering (Second Edition)", Aug. 31, 2013, p. 46.

Huang et al., "Corrosion Resistance and Corrosion Data of Materials", Jan. 31, 2003, p. 19.

Wen et al., "Development Technology of Welding Rod", Jun. 30, 2001, pp. 69-72.

Xue et al., "Manual of Welding Materials", Jan. 31, 2006, pp. 10-11.

AWS A.36/A5.36M: 2016 An American National Standard.

American Welding Society, AWS, AWS Welding Inspector Examination/Certification part B 2006: Examination Book of Specifications, [http:// https:l/app.aws.org/certification/docs/partb2006 .pdf] accessed: May 8, 2020 (Year: 2006).

Metalsupermarkets.com, What is mild Steel?, [http:// https:l/www.metalsupermarkets.com/what-is-mild-steell] Accessed: May 8, 2020 (Year: 2016).

Zhang, et al., "Welding Electrode (Design, Manufacture and Selection)", Machinery Industry Press, First edition and First printing of Jun. 1996.

Chen Hui, et. al., "New Welding Technology", Shanghai Science and Technology Press, Apr. 30, 1981, pp. 131-132.

Tang Zhongming, et. al., "The Welder", Shandong Science and Technology Press, Jan. 31, 2015, Table 2-26 of p. 65.

McHugh, "Chapter 2—Production, Properties and Uses of Alginates," www.fao.org/3/x5822e04.htm, Sep. 25, 2021, 39 pages.

(56) References Cited

OTHER PUBLICATIONS

EPO, "Communication pursuant to Article 94(3) EPC," issued in Application No. 16194283.4, dated Oct. 14, 2021, 6 pages.

* cited by examiner

SYSTEMS AND METHODS FOR WELDING ELECTRODES

CROSS-REFERENCE TO RELATED APPLICATIONS

This application is a divisional application of U.S. application Ser. No. 13/743,178, now U.S. Pat. No. 9,999,944, entitled "SYSTEMS AND METHODS FOR WELDING ELECTRODES," filed on Jan. 16, 2013, which is a continuation-in-part application of U.S. application Ser. No. 13/596,713, now U.S. Pat. No. 9,199,341, entitled "SYSTEMS AND METHODS FOR WELDING ELECTRODES," filed on Aug. 28, 2012, the disclosure of each of which is hereby incorporated by reference in its entirety for all purposes.

BACKGROUND

The invention relates generally to welding and, more specifically, to electrodes for arc welding, such as Gas Metal Arc Welding (GMAW) or Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process, while others (e.g., Flux Core Arc Welding (FCAW), Submerged Arc Welding (SAW), and Shielded Metal Arc Welding (SMAW)) do not. Additionally, certain types of welding may involve a welding electrode in the form of welding wire. Welding wire may generally provide a supply of filler metal for the weld as well as provide a path for the current during the welding process. Furthermore, certain types of welding wire (e.g., tubular welding wire) may include one or more components (e.g., flux, arc stabilizers, or other additives) that may generally alter the welding process and/or the properties of the resulting weld.

BRIEF DESCRIPTION

In one embodiment, a tubular welding wire includes a sheath and a core, and the core includes an organic stabilizer component. Further, the organic stabilizer component includes an organic sub-component configured to release hydrogen near a surface of a workpiece during welding, and includes a Group I metal, Group II metal, or a combination thereof.

In another embodiment, a tubular welding wire includes a sheath and a core. Further, the core includes a rare earth silicide component, and wherein the rare earth silicide comprises cerium, lanthanum, or a combination thereof.

In another embodiment, a tubular welding wire configured to weld coated metal workpieces and to provide a weld having a porosity less than approximately 0.25 inches per inch of the weld at travel speeds greater than approximately 30 inches per minute.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
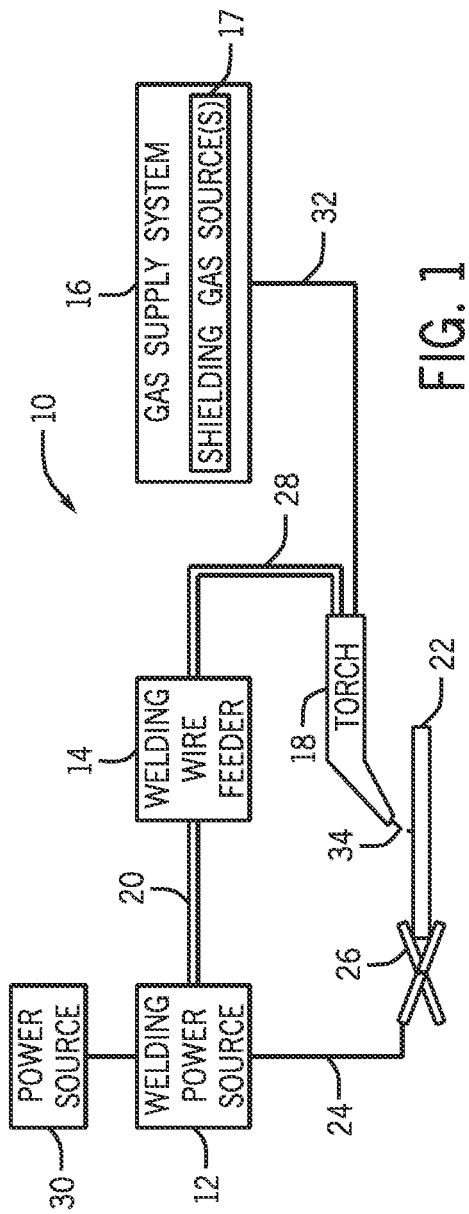
FIG. 1 is a block diagram of a gas metal arc welding (GMAW) system, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be appreciated that, as used herein, the term "tubular welding electrode" or "tubular welding wire" may refer to any welding wire or electrode having a metal sheath and a granular or powdered core, such as metal-cored or flux-cored welding electrodes. It should also be appreciated that the term "stabilizer" or "additive" may be generally used to refer to any component of the tubular welding that improves the quality of the arc, the quality of the weld, or otherwise affect the welding process. Furthermore, as used herein, "approximately" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value.

As mentioned, certain types of welding electrodes (e.g., tubular welding wire) may include one or more components (e.g., flux, arc stabilizers, or other additives) that may generally alter the welding process and the properties of the resulting weld. For example, certain presently disclosed welding electrode embodiments include an organic stabilizer (e.g., a derivatized cellulose-based component) that may generally improve the stability of the arc while providing a reducing atmosphere conducive to welding coated workpieces (e.g., galvanized workpieces). Certain presently disclosed welding electrode embodiments also include a rare earth silicide component that may generally help to control the shape and penetration of the arc during welding. Furthermore, the disclosed welding electrode embodiments may include other components such as, for example, a carbon component (e.g., graphite, carbon black, or other suitable carbon component), and an agglomerated stabilizer component (e.g., a potassium/titanate/manganate agglomerate), as set forth in detail below.

Accordingly, the presently disclosed welding electrodes enhance the weldability of coated (e.g., galvanized, galvannealed, painted, and so forth) workpieces and/or thinner (e.g., 20-, 22-, 24-gauge, or thinner) workpieces, even at high travel speed (e.g., greater than 40 in/min). Additionally, the disclosed welding electrodes generally enable acceptable welds under different welding configurations (e.g., direct current electrode negative (DCEN), direct current electrode positive (DCEP), alternating currents (AC), and so forth) and/or different welding methods (e.g., involving circular or serpentine welding electrode movements during welding). Additionally, certain presently disclosed welding electrodes may be drawn to particular diameters (e.g., 0.030 in, 0.035 in, 0.040 in, or other suitable diameters) to provide good heat transfer and deposition rates.

Turning to the figures, FIG. 1 illustrates an embodiment of a gas metal arc welding (GMAW) system 10 that utilizes a welding electrode (e.g., tubular welding wire) in accordance with the present disclosure. It should be appreciated that, while the present discussion may focus specifically on the GMAW system 10 illustrated in FIG. 1, the presently disclosed welding electrodes may benefit any arc welding process (e.g., FCAW, FCAW-G, GTAW, SAW, SMAW, or similar arc welding process) that uses a welding electrode. The welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (i.e., the welding electrode) and power to the welding torch 18 during operation of the welding system 10. In another embodiment, the welding power unit 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed welding electrodes (e.g., tubular welding wire) may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, $Ar/CO_2$ mixtures, $Ar/CO_2/O_2$ mixtures, Ar/He mixtures, and so forth. By specific example, in certain embodiments, the shielding gas flow may include 90% Ar and 10% $CO_2$.

Accordingly, the illustrated welding torch 18 generally receives the welding electrode (i.e., the tubular welding wire), power from the welding wire feeder 14, and a shielding gas flow from the gas supply system 16 in order to perform GMAW of the workpiece 22. During operation, the welding torch 18 may be brought near the workpiece 22 so that an arc 34 may be formed between the consumable welding electrode (i.e., the welding wire exiting a contact tip of the welding torch 18) and the workpiece 22. Additionally, as discussed below, by controlling the composition of the welding electrode (i.e., the tubular welding wire), the chemistry of the arc 34 and/or the resulting weld (e.g., composition and physical characteristics) may be varied. For example, the welding electrode may include fluxing or alloying components that may affect the welding process (e.g., act as arc stabilizers) and, further, may become at least partially incorporated into the weld, affecting the mechanical properties of the weld. Furthermore, certain components of the welding electrode (i.e., welding wire) may also provide additional shielding atmosphere near the arc, affect the transfer properties of the arc 34, deoxidize the surface of the workpiece, and so forth.

Figure 2:
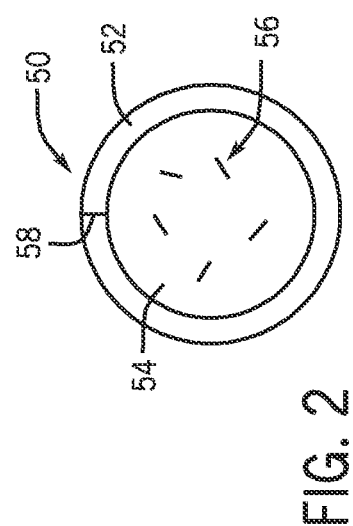
FIG. 2 is a cross-sectional view of a tubular welding wire, in accordance with embodiments of the present disclosure.

A cross-section of an embodiment of the presently disclosed welding wire is illustrated in FIG. 2. FIG. 2 illustrates a tubular welding wire 50 that includes a metallic sheath 52, which encapsulates a granular or powdered core 54 (also referred to as filler). In certain embodiments, the tubular welding wire 50 may comply with one or more American Welding Society (AWS) standards. For example, in certain embodiments, the tubular welding wire 50 may be in accordance with AWS A5.18 ("SPECIFICATION FOR CARBON STEEL ELECTRODES AND RODS FOR GAS SHIELDED ARC WELDING") and/or with AWS A5.36 ("SPECIFICATION FOR CARBON AND LOW-ALLOY STEEL FLUX CORED ELECTRODES FOR FLUX CORED ARC WELDING AND METAL CORED ELECTRODES FOR GAS METAL ARC WELDING").

The metallic sheath 52 of the tubular welding wire 50 illustrated in FIG. 2 may be manufactured from any suitable metal or alloy, such as steel. It should be appreciated that the composition of the metallic sheath 52 may affect the composition of the resulting weld and/or the properties of the arc 34. In certain embodiments, the metallic sheath 52 may account for between approximately 80% and 90% of the total weight of the tubular welding wire 50. For example, in certain embodiments, the metallic sheath 52 may provide approximately 84% or approximately 86% of the total weight of the tubular welding wire 50.

As such, the metallic sheath 52 may include certain additives or impurities (e.g., alloying components, carbon, alkali metals, manganese, or similar compounds or elements) that may be selected to provide desired weld properties. In certain embodiments, the metallic sheath 52 of the tubular welding wire 50 may be a low-carbon strip that includes a relatively small (e.g., lower or reduced) amount of carbon (e.g., less than approximately 0.06%, less than approximately 0.07%, or less than approximately 0.08% carbon by weight). For example, in an embodiment, the metallic sheath 52 of the tubular welding wire 50 may include between approximately 0.07% and 0.08% carbon by weight. Additionally, in certain embodiments, the metallic sheath 52 may be made of steel generally having a small number of inclusions. For example, in certain embodiments, the metallic sheath 52 may include between approximately 0.25% and approximately 0.5%, or approximately 0.34% manganese by weight. By further example, in certain embodiments, the metallic sheath 52 may include less than approximately 0.02% phosphorus or sulfur by weight. The metallic sheath 52, in certain embodiments, may also include less than approximately 0.04% silicon by weight, less than approximately 0.05% aluminum by weight, less than approximately 0.1% copper by weight, and/or less than approximately 0.02% tin by weight.

The granular core 54 of the illustrated tubular welding wire 50 may generally be a compacted powder. In certain embodiments, the granular core 54 may account for between approximately 7% and approximately 40%, or between approximately 10% and approximately 20%, of the total weight of the tubular welding wire 50. For example, in certain embodiments, the granular core 54 may provide approximately 14%, approximately 15%, or approximately 16% of the total weight of the tubular welding wire 50. Furthermore, in certain embodiments, the components of the granular core 54, discussed below, may be homogenously or non-homogenously (e.g., in clumps or clusters 56) disposed within the granular core 54. For example, the granular core 54 of certain welding electrode embodiments (e.g., metal-cored welding electrodes) may include one or more metals (e.g., iron, iron titanium, iron silicon, or other alloys or metals) that may provide at least a portion of the filler metal for the weld. By specific example, in certain embodiments, the granular core 54 may include between approximately 70% and approximately 75% iron powder, as well as other alloying components, such as ferro-titanium (e.g., 40% grade), ferro-magnesium-silicon, and ferro-silicon powder (e.g., 50% grade, unstabilized). Other examples of components that may be present within the tubular welding wire 50 (i.e., in addition to the one or more carbon sources and the one or more alkali metal and/or alkali earth metal compounds) include other stabilizing, fluxing, and alloying components, such as may be found in METALLOY X-CEL™ welding electrodes available from Illinois Tool Works, Inc.

Additionally, presently disclosed embodiments of the tubular welding wire 50 may include an organic stabilizer disposed in the granular core 54. The organic stabilizer may be any organic molecule that includes one or more alkali metal ions (e.g., Group I: lithium (Li), sodium (Na), potassium (K), rubidium (Rb), cesium (Cs)) or alkali metal ions (e.g., Group II: beryllium (Be), magnesium (Mg), calcium (Ca), strontium (Sr), or barium (Ba)). That is, in certain embodiments, the organic stabilizer includes an organic subcomponent (e.g., an organic molecule or polymer), which includes carbon, hydrogen, and oxygen, and may be chemically (e.g., covalently or ionically) bonded to the alkali metal or alkali earth metal ions. In other embodiments, the organic stabilizer may include an organic subcomponent (e.g., an organic molecule or polymer, such as cellulose) that has been mixed with (e.g., not chemically bonded with) the alkali metal and/or alkali earth metal salt (e.g., potassium oxide, potassium sulfate, sodium oxide, etc.).

By specific example, in certain embodiments, the organic stabilizer may be a cellulose-based (e.g., cellulosic) component including a cellulose chain that has been derivatized to form a sodium or potassium salt (e.g., sodium or potassium carboxymethyl cellulose). For example, in certain embodiments, the cellulose-based organic stabilizer may be sodium carboxymethyl cellulose having a degree of substitution (DS) ranging from approximately 0.5 and approximately 2.5. In general, the DS of a derivatized cellulose may be a real number between 0 and 3, representing an average number of substituted hydroxyl moieties in each monomer unit of the polysaccharide. In other embodiments, the organic stabilizer may be other organic molecules that include one or more Group I/Group II ions. For example, in certain embodiments, the organic stabilizer may include derivatized sugars (e.g., derivatized sucrose, glucose, etc.) or polysaccharides having one or more carboxylic acids or sulfate moieties available to form an alkali metal or alkali earth metal salt. In other embodiments, the organic stabilizer may include soap-like molecules (e.g., sodium dodecyl sulfate or sodium stearate) or alginates. Additionally, in certain embodiments, the organic stabilizer may account for less than approximately 10%, between approximately 0.05% and approximately 5%, between approximately 0.1% and approximately 3%, between approximately 0.25% and approximately 2.5%, between approximately 0.5% and approximately 1.5%, or approximately 1% of the granular core 54 by weight. Additionally, in certain embodiments, the organic stabilizer may account for less than approximately 5%, between approximately 0.05% and approximately 3%, between approximately 0.08% and approximately 2%, between approximately 0.1% and approximately 1%, or approximately 0.15% of the tubular welding wire 50 by weight.

It may be appreciated that the organic stabilizer component of the tubular welding wire 50 may be maintained at a suitable level such that a reducing environment (e.g., hydrogen-rich) may be provided near the welding arc, but without introducing substantial porosity into the weld. It should further be appreciated that utilizing an organic molecule as a delivery vehicle for at least a portion of the Group I/Group II ions to the welding arc, as presently disclosed, may not be widely used since organic molecules may generate hydrogen under the conditions of the arc, which may result in porous and/or weak welds for mild steels. However, as set forth below, using the presently disclosed organic stabilizers afford quality welds (e.g., low-porosity welds), even when welding at high travel speed on coated (e.g., galvanized) and/or thin workpieces.

Additionally, presently disclosed embodiments of the tubular welding wire 50 may also include a carbon component disposed in the granular core 54. For example, the carbon source present in the granular core 54 and/or the metal sheath 52 may be in a number of forms and may stabilize the arc 34 and/or increase the carbon content of the weld. For example, in certain embodiments, graphite, graphene, nanotubes, fullerenes and/or similar substantially $sp^2$-hybridized carbon sources may be utilized as the carbon source in the tubular welding wire 50. Furthermore, in certain embodiments, graphene or graphite may be used to also provide other components (e.g., moisture, gases, metals, and so forth) that may be present in the interstitial space between the sheets of carbon. In other embodiments, substantially $sp^3$-hybridized carbon sources (e.g., micro- or nano-diamond, carbon nanotubes, buckyballs) may be used as the carbon source. In still other embodiments, substantially amorphous carbon (e.g., carbon black, lamp black, soot, and/or similar amorphous carbon sources) may be used as the carbon source. Furthermore, while the present disclosure may refer to this component as a "carbon source," it should be appreciated that the carbon source may be a chemically modified carbon source that may contain elements other than carbon (e.g., oxygen, halogens, metals, and so forth). For example, in certain embodiments, the tubular welding wire 50 may include a carbon black component in the granular core 54 that may contain a manganese content of approximately 20%. In certain embodiments, the carbon component of the tubular welding wire 50 may be powdered or granular graphite. Additionally, in certain embodiments, the carbon component may account for less than approximately 10%, between approximately 0.01% and approximately 5%, between approximately 0.05% and approximately 2.5%, between approximately 0.1% and approximately 1%, or approximately 0.5% of the granular core 54 by weight. In certain embodiments, the carbon component may account for less than approximately 5%, between approximately 0.01% and approximately 2.5%, between approximately 0.05% and approximately 0.1%, or approximately 0.08% of the tubular welding wire 50 by weight.

Furthermore, in addition to the organic stabilizer discussed above, the tubular welding wire 50 may also include one or more inorganic stabilizers to further stabilize the arc 34. That is, the granular core 54 of the tubular welding wire 50 may include one or more compounds of the Group 1 and Group 2 elements (e.g., Li, Na, K, Rb, Cs, Be, Mg, Ca, Sr, Ba). A non-limiting list of example compounds include: Group 1 (i.e., alkali metal) and Group 2 (i.e., alkaline earth metal) silicates, titanates, carbonates, halides, phosphates, sulfides, hydroxides, oxides, permanganates, silicohalides, feldspars, pollucites, molybdenites, and molybdates. For example, in an embodiment, the granular core 54 of the tubular welding wire 50 may include potassium manganese titanate, potassium sulfate, sodium feldspar, potassium feldspar, and/or lithium carbonate. By specific example, the granular core 54 may include potassium silicate, potassium titanate, potassium alginate, potassium carbonate, potassium fluoride, potassium phosphate, potassium sulfide, potassium hydroxide, potassium oxide, potassium permanganate, potassium silicofluoride, potassium feldspar, potassium molybdates, or a combination thereof as the potassium source. Similar examples of stabilizing compounds that may be used are described in U.S. Pat. No. 7,087,860, entitled "STRAIGHT POLARITY METAL CORED WIRES," and U.S. Pat. No. 6,723,954, entitled "STRAIGHT POLARITY METAL CORED WIRE," which are both incorporated by reference in their entireties for all purposes.

Furthermore, for certain embodiments of the presently disclosed tubular welding wire 50, one or more inorganic stabilizers may be included in the granular core 54 in the form of an agglomerate or frit. That is, certain embodiments of the tubular welding wire 50 may include one or more of the inorganic stabilizers described above in an agglomerate or frit that may stabilize the arc during welding. The term "agglomerate" or "frit," as used herein, refers to a mixture of compounds that have been fired or heated in a calciner or oven such that the components of the mixture are in intimate contact with one another. It should be appreciated that the agglomerate may have subtly or substantially different chemical and/or physical properties than the individual components of the mixture used to form the agglomerate. For example, agglomerating, as presently disclosed, may provide a frit that is better suited for the weld environment than the non-agglomerated materials.

In certain embodiments, the granular core 54 of the tubular welding wire 50 may include an agglomerate of one or more alkali metal or alkaline earth metal compounds (e.g., potassium oxide, sodium oxide, calcium oxide, magnesium oxide, or other suitable alkali metal or alkaline earth metal compound). In other embodiments, the granular core 54 of the tubular welding wire 50 may include an agglomerate of a mixture of alkali metal or alkaline earth metal compound and other oxides (e.g., silicon dioxide, titanium dioxide, manganese dioxide, or other suitable metal oxides). For example, one embodiment of a tubular welding wire 50 may include an agglomerated potassium source including of a mixture of potassium oxide, silica, and titania. By further example, another embodiment of a tubular welding wire 50 may include in the granular core 54 another stabilizing agglomerate having a mixture of potassium oxide (e.g., between approximately 22% and 25% by weight), silicon oxide (e.g., between approximately 10% and 18% by weight), titanium dioxide (e.g., between approximately 38% and 42% by weight), and manganese oxide or manganese dioxide (e.g., between approximately 16% and 22% by weight). In certain embodiments, an agglomerate may include between approximately 5% and 75% alkali metal and/or alkaline earth metal compound (e.g., potassium oxide, calcium oxide, magnesium oxide, or other suitable alkali metal and/or alkaline earth metal compound) by weight, or between approximately 5% and 95% alkali metal and/or alkaline earth metal (e.g., potassium, sodium, calcium, magnesium, or other suitable alkali metal and/or alkaline earth metal) by weight. Furthermore, in certain embodiments, other chemical and/or physical factors (e.g., maximizing alkali metal and/or alkaline earth metal loading, acidity, stability, and/or hygroscopicity of the agglomerate) may be considered when selecting the relative amounts of each component present in the agglomerate mixture. Additionally, in certain embodiments, the agglomerate may account for less than approximately 10%, between approximately 0.1% and approximately 6%, between approximately 0.25% and approximately 2.5%, between approximately 0.5% and approximately 1.5%, or approximately 1% of the granular core 54 by weight. In certain embodiments, the agglomerate may account for less than approximately 5%, between approximately 0.05% and approximately 2.5%, between approximately 0.1% and approximately 0.5%, or approximately 0.15% of the tubular welding wire 50 by weight.

Additionally, the granular core 54 of the tubular welding wire 50 may also include other components to control the welding process. For example, rare earth elements may generally affect the stability and heat transfer characteristics of the arc 34. As such, in certain embodiments, the tubular welding wire 50 may include a rare earth component, such as the Rare Earth Silicide (e.g., available from Miller and Company of Rosemont, Ill.), which may include rare earth elements (e.g., cerium and lanthanum) and other non-rare earth elements (e.g., iron and silicon). In other embodiments, any material including cerium or lanthanum (e.g., nickel lanthanum alloys) may be used in an amount that does not spoil the effect of the present approach. By specific example, in certain embodiments, the rare earth component may account for less than approximately 10%, between approximately 0.01% and approximately 8%, between approximately 0.5% and approximately 5%, between approximately 0.25% and approximately 4%, between approximately 1% and approximately 3%, between approximately 0.75% and approximately 2.5%, or approximately 2% of the granular core 54 by weight. In certain embodiments, the rare earth component may account for less than approximately 5%, between approximately 0.01% and approximately 2.5%, between approximately 0.1% and approximately 0.75%, or approximately 0.3% of the tubular welding wire 50 by weight.

Furthermore, the tubular welding wire 50 may, additionally or alternatively, include other elements and/or minerals to provide arc stability and to control the chemistry of the resulting weld. For example, in certain embodiments, the granular core 54 and/or the metallic sheath 52 of the tubular welding wire 50 may include certain elements (e.g., titanium, manganese, zirconium, fluorine, or other elements) and/or minerals (e.g., pyrite, magnetite, and so forth). By specific example, certain embodiments may include zirconium silicide, nickel zirconium, or alloys of titanium, aluminum, and/or zirconium in the granular core 54. In particular, sulfur containing compounds, including various sulfide, sulfate, and/or sulfite compounds (e.g., such as molybdenum disulfide, iron sulfide, manganese sulfite, barium sulfate, calcium sulfate, or potassium sulfate) or sulfur-containing compounds or minerals (e.g., pyrite, gypsum, or similar sulfur-containing species) may be included in the granular core 54 to improve the quality of the resulting weld by improving bead shape and facilitating slag detachment, which may be especially useful when welding galvanized workpieces, as discussed below. Furthermore, in certain embodiments, the granular core 54 of the tubular welding wire 50 may include multiple sulfur sources (e.g., manganese sulfite, barium sulfate, and pyrite), while other embodiments of the tubular welding wire 50 may include only a single sulfur source (e.g., potassium sulfate) without including a substantial amount of another sulfur source (e.g., pyrite or iron sulfide). For example, in an embodiment, the granular core 54 of the tubular welding wire 50 may include between approximately 0.01% and approximately 0.5%, or approximately 0.2% potassium sulfate.

Generally speaking, the tubular welding wire 50 may generally stabilize the formation of the arc 34 to the workpiece 22. As such, the disclosed tubular welding wire 50 may improve more than one aspect of the welding process (e.g., deposition rate, travel speed, splatter, bead shape, weld quality, etc.). It should further be appreciated that the improved stability of the arc 34 may generally enable and improve the welding of coated metal workpieces and thinner workpieces. For example, in certain embodiments, the coated metal workpieces may include galvanized, galvanealed (e.g., a combination of galvanization and annealing), or similar zinc-coated workpieces. A non-limiting list of example coated workpieces further includes dipped, plated (e.g., nickel-plated, copper-plated, tin-plated, or electroplated or chemically plated using a similar metal), chromed, nitrite-coated, aluminized, or carburized workpieces. For example, in the case of galvanized workpieces, the presently disclosed tubular welding wire 50 may generally improve the stability and control the penetration of the arc 34 such that a good weld may be achieved despite the zinc coating on the outside of the workpiece 22. Additionally, by improving the stability of the arc 34, the disclosed tubular welding wire 50 may generally enable the welding of thinner workpieces than may be possible using other welding electrodes. For example, in certain embodiments, the disclosed tubular welding wire 50 may be used to weld metal having an approximately 14-, 16-, 18-, 20-, 22-, 24-gauge, or even thinner workpieces. For example, in certain embodiments, the disclosed tubular welding wire 50 may enable welding workpieces having a thickness less than approximately 5 mm, less than 3 mm, or even less than approximately 1.5 mm.

Furthermore, the presently disclosed tubular welding wire 50 enables welding (e.g., welding of thin gauge galvanized steels) at travel speeds in excess of 30 or even 40 inches per minute. For example, the tubular welding wire 50 readily enables high quality fillet welds at travel speeds above 40 inches per minute (e.g., 35 or 45 inches per minute) with low weld porosity. That is, the presently disclosed tubular welding wire 50 may enable higher (e.g., 50% to 75% higher) travel speeds than other solid-cored, metal-cored, or flux-cored welding wires. It should be appreciated that higher travel speeds may enable higher production rates (e.g., on a production line) and reduce costs. Additionally, the presently disclosed tubular welding wire 50 exhibits good gap handling and provides excellent weld properties (e.g., strength, ductility, appearance, and so forth) using a wide operating process window. Further, the tubular welding wire 50 generally produces less smoke and spatter than other solid-cored, metal-cored, or flux-cored welding wires.

Furthermore, the disclosed tubular welding wire 50 may also be combined with certain welding methods or techniques (e.g., techniques in which the welding electrode moves in a particular manner during the weld operation) that may further increase the robustness of the welding system 10 for particular types of workpieces. For example, in certain embodiments, the welding torch 18 may be configured to cyclically or periodically move the electrode in a desired pattern (e.g., a circular, spin arc, or serpentine pattern) within the welding torch 18 in order to maintain an arc 34 between the tubular welding wire 50 and the workpiece 22 (e.g., only between the sheath 52 of the tubular welding wire 50 and the workpiece 22). By specific example, in certain embodiments, the disclosed tubular welding wire 50 may be utilized with welding methods such as those described in U.S. Provisional Patent Application Ser. No. 61/576,850, entitled "DC ELECTRODE NEGATIVE ROTATING ARC WELDING METHOD AND SYSTEM,"; in U.S. patent application Ser. No. 13/681,687, entitled "DC ELECTRODE NEGATIVE ROTATING ARC WELDING METHOD AND SYSTEM"; and in U.S. Provisional Patent Application Ser. No. 61/676,563, entitled "ADAPTABLE ROTATING ARC WELDING METHOD AND SYSTEM"; which are all incorporated by reference herein in their entireties for all purposes. It should be appreciated that such welding techniques may be especially useful when welding thin workpieces (e.g., having 20-, 22-, or 24-gauge thickness), as mentioned above.

Figure 3:
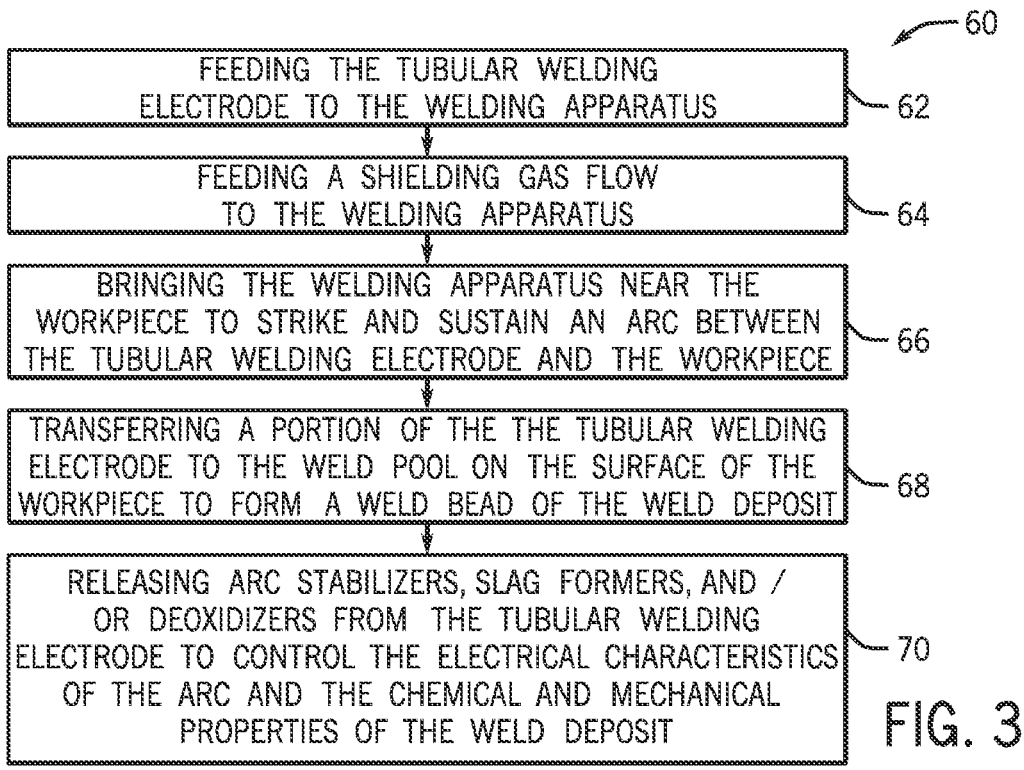
FIG. 3 is a process by which the tubular welding wire may be used to weld a workpiece, in accordance with embodiments of the present disclosure.

FIG. 3 illustrates an embodiment of a process 60 by which a workpiece 22 may be welded using the disclosed welding system 10 and tubular welding wire 50. The illustrated process 60 begins with feeding (block 62) the tubular welding electrode 50 (i.e., the tubular welding wire 50) to a welding apparatus (e.g., welding torch 18). As set forth above, in certain embodiments, the tubular welding wire 50 may include one or more organic stabilizer components (e.g., sodium carboxymethyl cellulose), one or more carbon components (e.g., graphite powder), and one or more rare earth components (e.g., rare earth silicide). Further, the tubular welding wire 50 may have an outer diameter between approximately 0.024 in and approximately 0.062 in, between approximately 0.030 in and approximately 0.060 in, between 0.035 in and approximately 0.052 in, or approximately 0.040 in. It may also be appreciated that, in certain embodiments, the welding system 10 may feed the tubular welding wire 50 at a suitable rate to enable a travel speed greater than 30 in/min or greater than 40 in/min.

Additionally, the process 60 includes providing (block 64) a shielding gas flow (e.g., 100% argon, 100% carbon dioxide, 75% argon/25% carbon dioxide, 90% argon/10% carbon dioxide, or similar shielding gas flow) near the contact tip of the welding apparatus (e.g., the contact tip of the torch 18). In other embodiments, welding systems may be used that do not use a gas supply system (e.g., such as the gas supply system 16 illustrated in FIG. 1) and one or more components (e.g., potassium carbonate) of the tubular welding wire 50 may decompose to provide a shielding gas component (e.g., carbon dioxide).

Next, the tubular welding wire 50 may be brought near (block 66) the workpiece 22 to strike and sustain an arc 34 between the tubular welding wire 50 and the workpiece 22. It should be appreciated that the arc 34 may be produced using, for example, a DCEP, DCEN, DC variable polarity, pulsed DC, balanced or unbalanced AC power configuration for the GMAW system 10. Once the arc 34 has been established to the workpiece 22, a portion of the tubular welding wire 50 (e.g., filler metals and alloying components) may be transferred (block 68) into the weld pool on the surface of the workpiece 22 to form a weld bead of a weld deposit. Meanwhile, the remainder of the components of the tubular welding wire 50 may be released (block 70) from the tubular welding wire 50 to serve as arc stabilizers, slag formers, and/or deoxidizers to control the electrical characteristics of the arc and the resulting chemical and mechanical properties of the weld deposit.

By specific example, it is believed that, for certain embodiments, the Group I or Group II metals (e.g., potassium and sodium ions) of the organic stabilizer may generally separate from the organic stabilizer and provide a stabilization effect to the arc. Meanwhile, it is believed that the organic portion (e.g., comprising at least carbon and hydrogen, but possibly including oxygen) may decompose under the conditions of the arc to provide a reducing (e.g., rich in hydrogen) atmosphere at or near the welding site. Accordingly, while not desiring to be bound by theory, it is believed that the resulting reducing atmosphere, and in potential combination with the Group I/Group II stabilizing metals, the rare earth components, cyclical motion, and so forth, presently disclosed, provides a welding solution enabling high travel speeds and low-porosity, even when welding coated workpieces or performing gap fills. For example, in certain embodiments, the tubular welding wire 50 may generally enable the welding of thinner workpieces as well as painted, galvanized, galvannealed, plated, aluminized, chromed, carburized, or other similar coated workpieces. For example, certain embodiments of the presently disclosed tubular welding wire 50 may enable welding workpieces having thicknesses less than 5 mm or less than 4 mm, or workpieces having thicknesses of approximately 1.3 mm or 1.2 mm, while maintaining high travel speed (e.g., in excess of 30 in/min) and low-porosity, even when performing gap fills (e.g., 1-3 mm gap fills).

Results for an example all-weld metal welding experiment using an embodiment of the disclosed tubular welding wire 50 according to the process 60 is set forth below in Table 1. It should be appreciated that the weld chemistry illustrated in Table 1 accounts for certain components of the weld metal (e.g., approximately 3% of the total weld metal) with the remaining percentage provided by iron. As shown in Table 1, the Charpy-V-Notch values for the resulting weld is approximately 35 ft. lbs. at approximately −30° C. and is approximately 24 ft. lbs at approximately −40° C. In certain embodiments, the Charpy-V-Notch values of a weld formed using the disclosed tubular welding wire 50 may generally range between approximately 20 ft. lbs. and approximately 45 ft. lbs. Additionally, for the experiment illustrated in Table 1, the resulting weld afforded an ultimate tensile strength (UTS) of approximately 116 kilopounds per square inch (kpsi) and a yield strength (YS) of approximately 105 kpsi (e.g., with 20% elongation). In certain embodiments, the weld formed using the disclosed tubular welding wire 50 may have a UTS in the range between approximately 100 kpsi and approximately 130 kpsi and/or a YS in the range between approximately 95 kpsi and approximately 115 kpsi and/or an elongation of approximately 10% to approximately 40%.

Furthermore, it may be appreciated that the present approach enables low-porosity (e.g., a low surface porosity and/or low total porosity) welds to be attained at high travel speed (e.g., in excess of 30 in/min or 40 in/min), even when welding coated workpieces. In certain embodiments, the low-porosity enabled by the presently disclosed tubular welding wire 50 may provide a weld that is substantially non-porous. In other embodiments, the disclosed tubular welding wire 50 may provide a low-porosity weld having only small voids or pores (e.g., less than approximately 1.6 mm in diameter) that are separated from one another by a distance greater than or equal to the respective diameter of each pore. Further, in certain embodiments, the porosity may be represented as a sum of the diameters of the pores encountered per distance of the weld in a direction (e.g., along the weld axis). For such embodiments, the weld may have a porosity less than approximately 0.3 inches per inch of weld, less than approximately 0.25 inches per inch of weld, less than approximately 0.2 inches per inch of weld, or less than approximately 0.1 inches per inch of weld. It may be appreciated that the porosity of the weld may be measured using an X-ray analysis, microscope analysis, or another suitable method.

TABLE 1

Welding experiment using an embodiment of tubular welding wire 50.

| Welding Parameters | | Weld Chemistry (%) | |
| --- | --- | --- | --- |
| Amps | 270 | Carbon | 0.126 |
| Volts | 28 | Manganese | 1.671 |
| Current | DCEN | Phosphorus | 0.009 |
| Wire Feed Speed | 425 in/min | Sulfur | 0.012 |
| Travel Speed | 10 in/min | Silicon | 0.883 |
| Charpy-V-Notch at −29° C. | 35 ft. lbs. | Copper | 0.039 |
| Charpy-V-Notch at −40° C. | 24 ft. lbs. | Chromium | 0.045 |
| Tensile Strength (UTS) | 116 kpsi | Vanadium | 0.005 |
| Tensile Strength (YS) | 105 kpsi | Nickel | 0.017 |
| | | Molybdenum | 0.006 |
| | | Aluminum | 0.014 |
| | | Titanium | 0.033 |
| | | Niobium | 0.002 |
| | | Cobalt | 0.003 |
| | | Boron | 0.0008 |
| | | Tungsten | 0.006 |

TABLE 1-continued

Welding experiment using an embodiment of tubular welding wire 50.

| Welding Parameters | Weld Chemistry (%) | |
| --- | --- | --- |
| | Tin | 0.003 |
| | Zirconium | 0.001 |
| | Antimony | 0.002 |
| | Arsenic | 0.003 |

Figure 4:
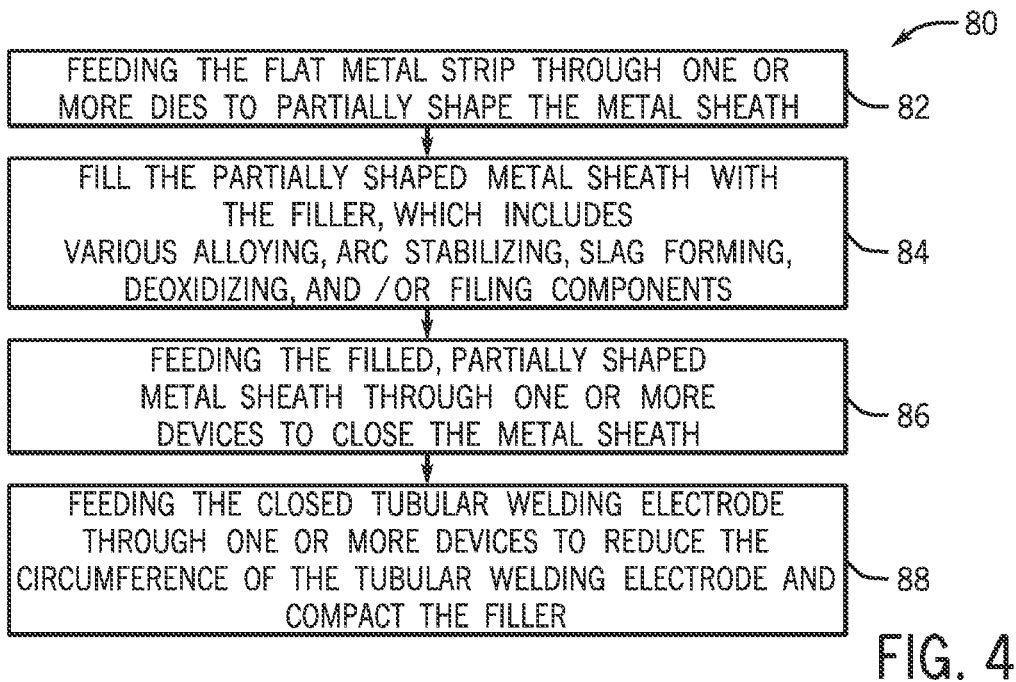
FIG. 4 is a process for manufacturing the tubular welding wire, in accordance with embodiments of the present disclosure.

FIG. 4 illustrates an embodiment of a process 80 by which the tubular welding wire 50 may be manufactured. It may be appreciated that the process 80 merely provides an example of manufacturing a tubular welding wire 50; however, in other embodiments, other methods of manufacturing may be used to produce the tubular welding wire 50 without spoiling the effect of the present approach. That is, for example, in certain embodiments, the tubular welding wire 50 may be formed via a roll-forming method or via packing the core composition into a hollow metallic sheath. The process 80 illustrated in FIG. 4 begins with a flat metal strip being fed (block 82) through a number of dies that shape the strip into a partially circular metal sheath 52 (e.g., producing a semicircle or trough). After the metal strip has been at least partially shaped into the metal sheath 52, it may be filled (block 84) with the filler (e.g., the granular core 54). That is, the partially shaped metal sheath 52 may be filled with various powdered alloying, arc stabilizing, slag forming, deoxidizing, and/or filling components. For example, among the various fluxing and alloying components, one or more organic stabilizer components (e.g., sodium carboxymethyl cellulose), one or more carbon components (e.g., graphite powder), and one or more rare earth components (e.g., rare earth silicide) may be added to the metal sheath 52. Furthermore, in certain embodiments, other components (e.g., rare earth silicide, magnetite, titanate, pyrite, iron powders, and/or other similar components) may also be added to the partially shaped metal sheath 52.

Next in the illustrated process 80, once the components of the granular core material 54 have been added to the partially shaped metal sheath 52, the partially shaped metal sheath 52 may then be fed through (block 86) one or more devices (e.g., drawing dies or other suitable closing devices) that may generally close the metal sheath 52 such that it substantially surrounds the granular core material 54 (e.g., forming a seam 58). Additionally, the closed metal sheath 52 may subsequently be fed through (block 88) a number of devices (e.g., drawing dies or other suitable devices) to reduce the circumference of the tubular welding wire 50 by compressing the granular core material 54. In certain embodiments, the tubular welding wire 50 may subsequently be heated to between approximately 300° F. and approximately 650° F. for approximately 4 to 6 hours prior to packaging the tubular welding wire onto a spool, reel, or drum for transport, while, in other embodiments, the tubular welding wire 50 may be packaged without this baking step.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tubular welding wire, comprising:
   a steel sheath disposed around a granular core;
   wherein the granular core comprises:
      a rare earth silicide component; and
      an organic arc stabilizer component, wherein the organic arc stabilizer component is a cellulose polymer that includes Group I metal ions selected from the group consisting of lithium (Li), sodium (Na), potassium (K), rubidium (Rb), and cesium (Cs), or includes Group II metal ions selected from the group consisting of beryllium (Be), magnesium (Mg), calcium (Ca), strontium (Sr), and barium (Ba), or a combination thereof, that are chemically bound to the cellulose polymer;
   wherein the rare earth silicide component comprises cerium, lanthanum, or a combination thereof; and
   wherein the organic arc stabilizer component decomposes under conditions of an arc and releases hydrogen and releases the Group I metal ions, or the Group II metal ions, or the combination thereof, near a surface of a workpiece during arc welding.

2. The tubular welding wire of claim 1, wherein the rare earth silicide component comprises between 0.1% and 5% of the tubular welding wire by weight.

3. The tubular welding wire of claim 1, wherein the granular core further comprises:
   a carbon component comprising graphite, graphene, carbon black, lamp black, carbon nanotubes, diamond, or a combination thereof; and
   an agglomerate comprising oxides of one or more Group I or Group II metals, titanium, and manganese.

4. The tubular welding wire of claim 1, wherein the tubular welding wire is configured for welding coated metal workpieces, wherein the tubular welding wire is configured to provide a weld having a porosity less than 0.25 inches per inch of the weld at travel speeds greater than 30 inches per minute.

5. The tubular welding wire of claim 4, wherein the porosity is less than 0.10 inches per 1 inch of the weld.

6. The tubular welding wire of claim 4, wherein the weld has a Charpy-V-Notch toughness greater than 20 ft. lbs. at −40° F. and greater than 30 ft. lbs. at −30° F.

7. The tubular welding wire of claim 1, wherein the granular core further comprises a potassium source.

8. The tubular welding wire of claim 7, wherein the potassium source includes potassium silicate, potassium titanate, potassium alginate, potassium carbonate, potassium fluoride, potassium phosphate, potassium sulfide, potassium hydroxide, potassium oxide, potassium permanganate, potassium silicofluoride, potassium feldspar, potassium molybdates, or a combination thereof.

9. The tubular welding wire of claim 7, wherein the potassium source includes potassium alginate.

10. The tubular welding wire of claim 1, wherein the organic arc stabilizer component comprises between 0.01% and 5% by weight of the tubular welding wire.

* * * * *